United States Patent [19]
Egner-Walter et al.

[11] Patent Number: 5,652,994
[45] Date of Patent: Aug. 5, 1997

[54] WIPER ARM ESPECIALLY FOR CLEANING WINDSHIELDS OF MOTOR VEHICLES

[75] Inventors: Bruno Egner-Walter, Heilbronn; Peter Kiersten, Oberstenfeld; Eckhardt Schmid, Brackenheim; Rudolf Steiblmuller, Ludwigsburg, all of Germany

[73] Assignee: SWF Auto-Electric GmbH, Germany

[21] Appl. No.: 569,549

[22] Filed: Dec. 8, 1995

Related U.S. Application Data

[63] Continuation of Ser. No. 105,234, Aug. 11, 1993, abandoned.

[51] Int. Cl.$^6$ ................... B60S 1/34; B60S 1/32
[52] U.S. Cl. .................. 15/250.351; 15/250.352; 15/250.34; 15/250.31; 403/230; 74/25; 74/47; 74/588
[58] Field of Search .............. 15/250.35, 250.34, 15/250.31, 250.3, 250.25, 250.13, 250.2; 403/244, 230; 74/42, 43, 25, 47, 588, 579.12, 586, 545, 594.1, 595

[56] References Cited

U.S. PATENT DOCUMENTS

| | | | |
|---|---|---|---|
| 257,691 | 5/1882 | Gatchell | 74/545 |
| 929,638 | 7/1909 | Suren | 74/545 |
| 1,343,310 | 6/1920 | Cristen | 15/250.34 |
| 1,573,618 | 2/1926 | Laganke | 15/250.35 |
| 1,662,244 | 3/1928 | Folberth et al. | 15/250.34 |
| 1,701,105 | 2/1929 | Folberth et al. | 15/250.34 |
| 2,493,527 | 1/1950 | Carey | 15/250.34 |
| 2,887,899 | 5/1959 | Urbas | 74/545 |
| 3,016,766 | 1/1962 | Hoyler | 15/250.3 |

FOREIGN PATENT DOCUMENTS

| | | | |
|---|---|---|---|
| 654505 | 11/1928 | France | 15/250.34 |
| 2208364 | 10/1974 | France . | |
| 2647510 | 4/1978 | Germany | 15/250.34 |
| 3926714 | 2/1991 | Germany . | |
| 255658 | 7/1926 | United Kingdom | 15/250.34 |

OTHER PUBLICATIONS

PCT Search Report (German Language).

*Primary Examiner*—Gary K. Graham
*Attorney, Agent, or Firm*—J. Gordon Lewis; Thomas N. Twomey

[57] ABSTRACT

The invention refers to a wiper arm with a fixing part made from asheet metal, comprising a bore for the non-rotatable fixation on a wiper shaft and which is provided at least around the bore with an upper sheet metal section and a bottom sheet metal section being integrally connected and lying approximately in parallel to said upper sheet metal section. In order to provide the fixing part in the area of the bore with a high stability of form, a sheet metal section is supported against the flat side of the other sheet metal section around the bore at a distance from the outline of the fixing part which can be noticed when looked at in direction of the axis of the bore.

21 Claims, 5 Drawing Sheets

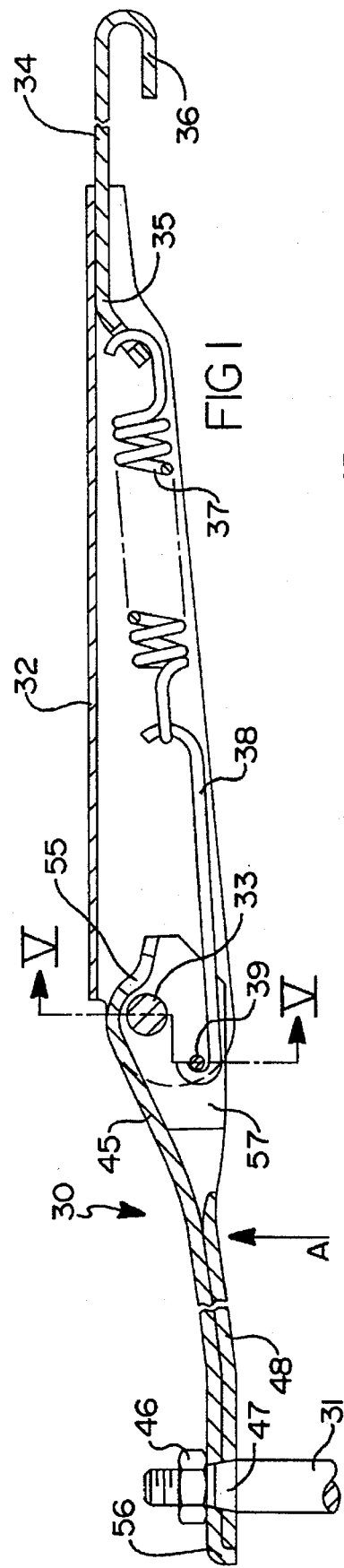
FIG 1
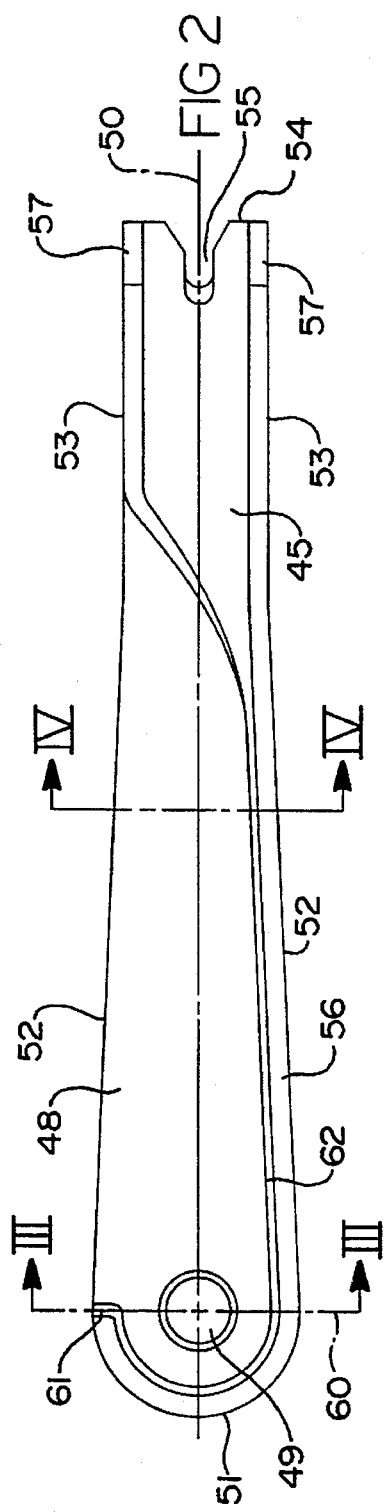
FIG 2
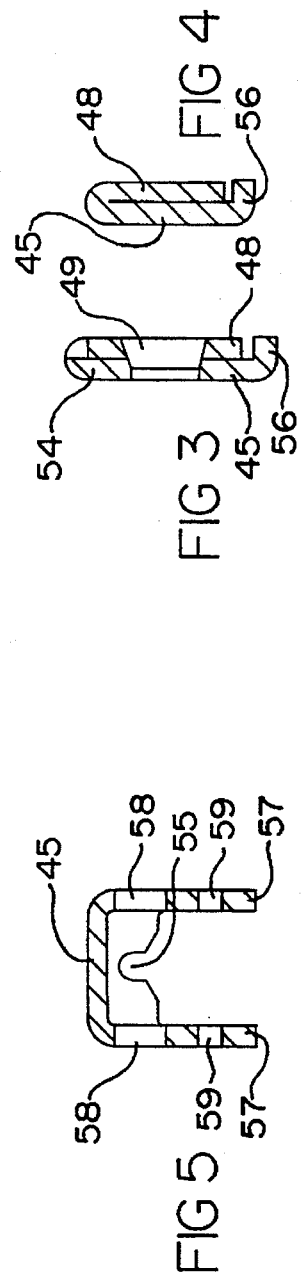
FIG 3
FIG 4
FIG 5

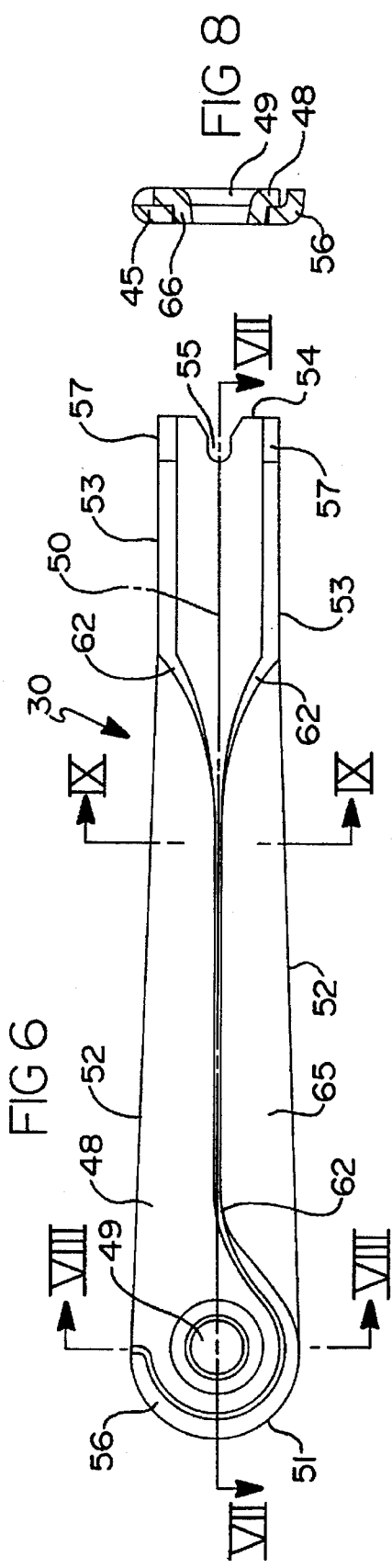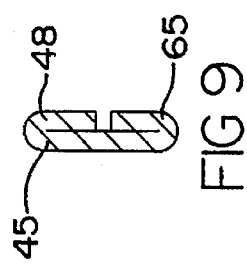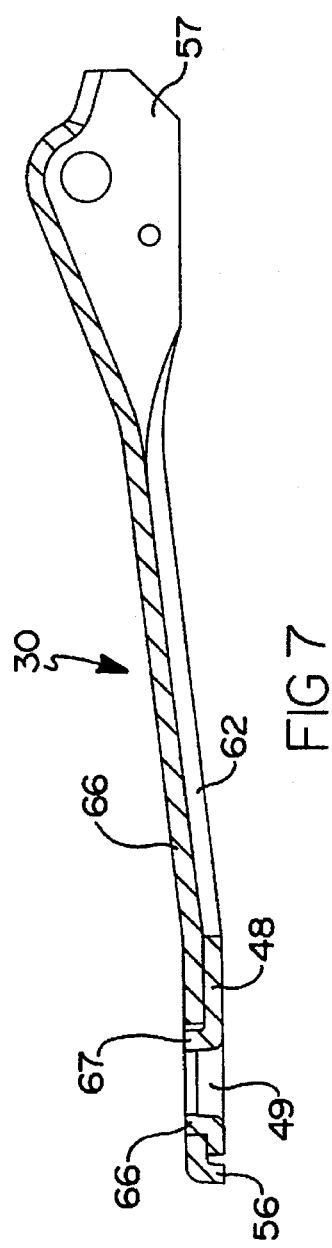

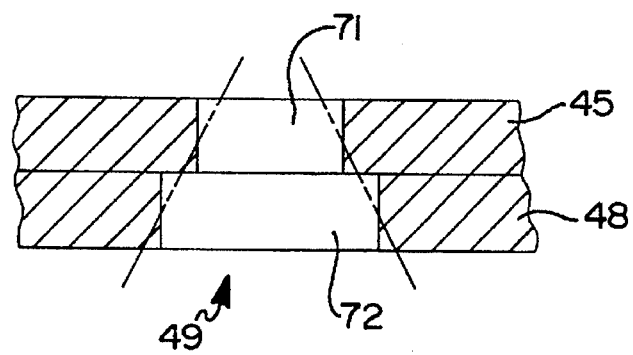
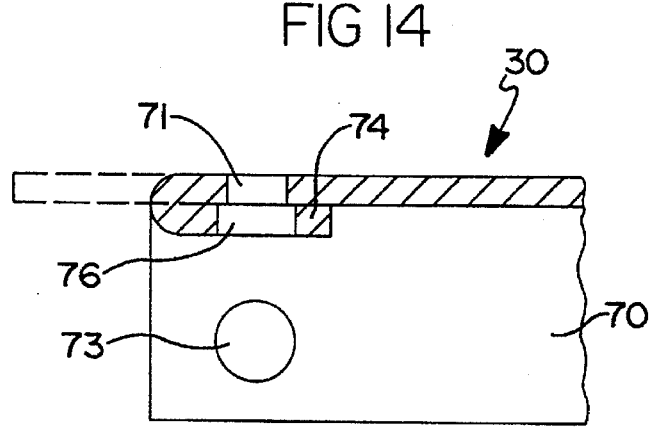
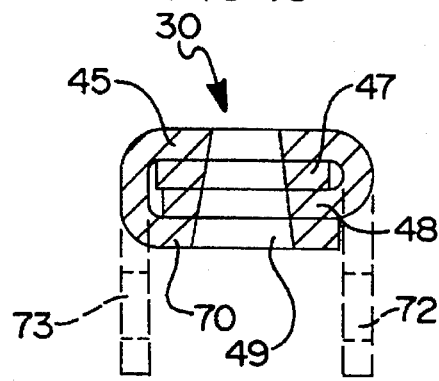
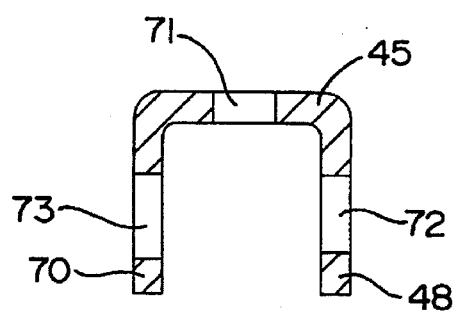
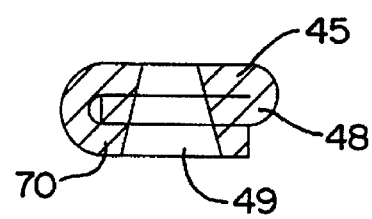

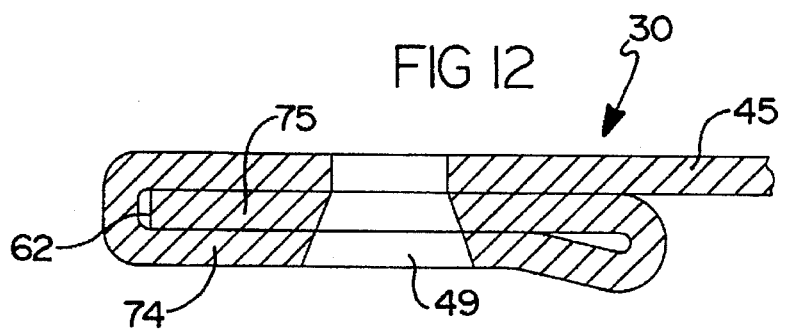
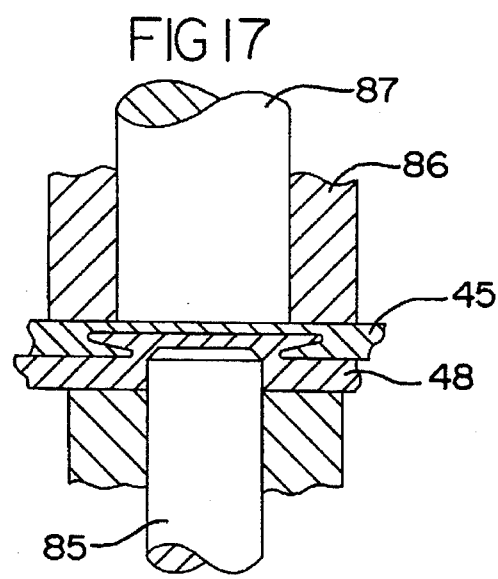
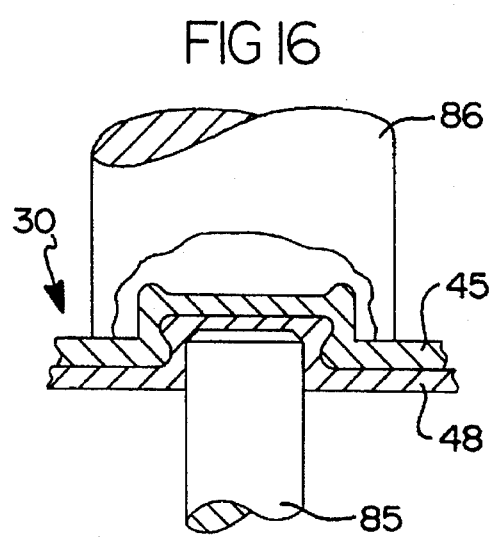
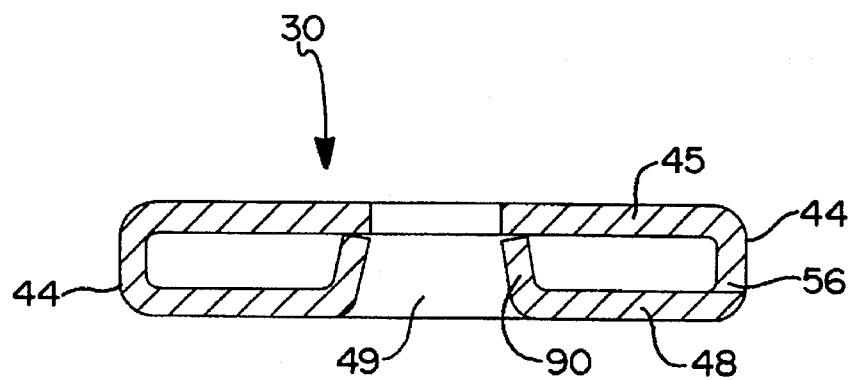

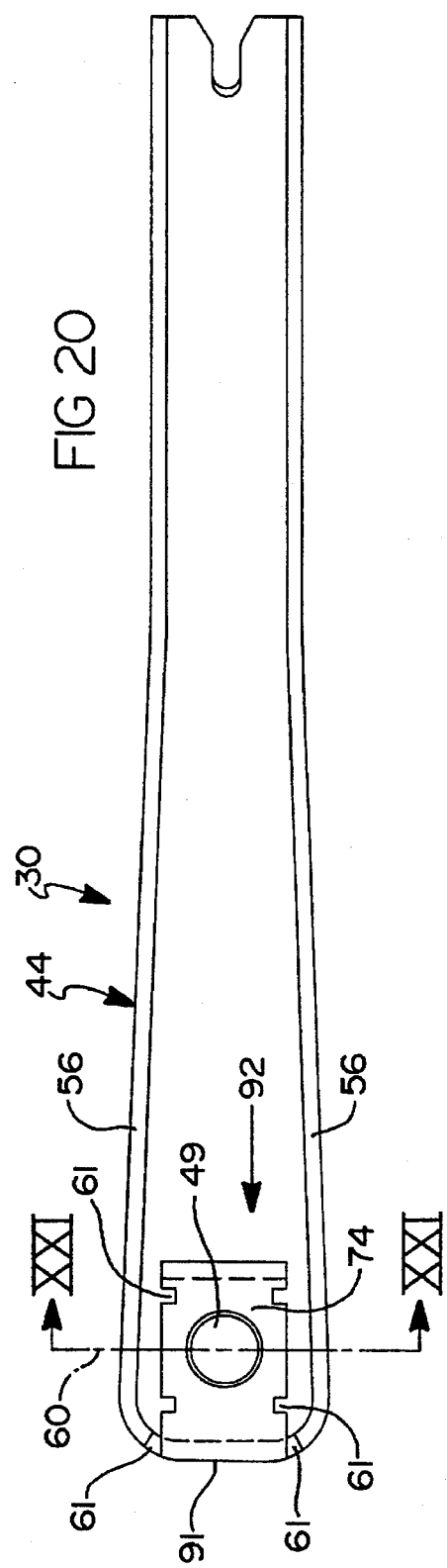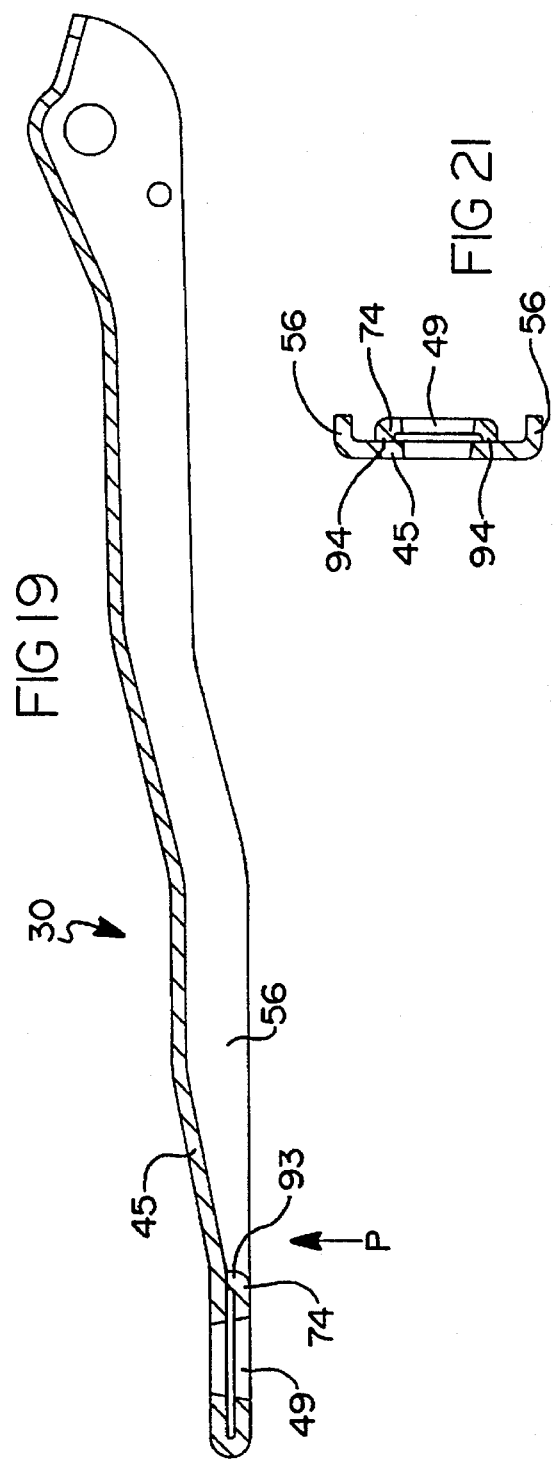

WIPER ARM ESPECIALLY FOR CLEANING WINDSHIELDS OF MOTOR VEHICLES

This application is a continuation of application Ser. No. 08/105,234 filed on Aug. 11,1993 now abandoned International Application PCT/EP92/02791 filed on Dec. 3, 1991 and which designated the U.S., claiming priority from P 41 40 958.2 filed in Germany on Dec. 12, 1991.

BACKGROUND

The invention relates to a wiper arm, especially those used for cleaning windshields of motor vehicles.

A wiper arm is already known from DE-0 34 28 795, the fixing part of which is not manufactured by diecasting, but is formed of sheet metal. The fixing part essentially consists of one single plane plate, at which cheeks are laterally set up and which is deep-drawn to form a collar in the area of the bore for the wiper shaft, with the collar surrounding said bore. The collar tapers conically according to a conical fixing section of the wiper shaft. Although this design is satisfactory for some applications, the drafted fixing part made of sheet metal may not meet the strict strength and stability requirements of some applications.

DE-OS 39 26 714 also shows a wiper arm with a fixing part made of sheet metal. Here, the fixing part comprises an upper sheet metal section and a bottom sheet metal section integrally connected with said upper sheet metal section and parallely situated to it, the sections being supported against each other by means of side cheeks set up by the one sheet metal section, along the outline to be recognized when looking at the wiper arm in direction of the axis of the bore. In this case the one sheet metal section is seen as upper sheet metal section, which is further away from the windshield than the other sheet metal section when the wiper arm lies on a windshield. In order to increase the stability of this box-shaped fixing part in the area of the bores above all, a collar deep-drawn from the bottom sheet metal section and surrounding the bore is pressed into a hole of the upper sheet metal section. The manufacturing of such a fixing part, especially the pressing-in of the collar of the bottom sheet metal section into the hole of the upper sheet metal section is relatively difficult. By pressing-in the collar into the upper sheet metal section this collar is well supported by the upper sheet metal section in a radial direction, however, the support of the two sheet metal sections in axial direction of the bore still is lacking.

The object of the invention is to improve upon a wiper arm in such a way that the stability of the fixing part is enhanced.

This object is achieved according to the present invention by a wiper arm comprising a sheet metal section supported around the bore against a flat side of the other sheet metal section at a distance from the outline of the fixing part to be recognized, when looked at in direction of the axis of the bore. While in known fixing parts having an upper sheet metal section and a bottom sheet metal section, these two sections are axially supported against each other only via the side cheeks at the outline of the fixing part, and therefore only a bolster effect is achieved by the collar around the bore. In a wiper arm according to the invention, a full axial support is given near the bore. This is achieved in an easy way in that the one sheet metal section is supported at a flat side of the other sheet metal section.

In a preferred embodiment several integrally connected sheet metal sections of the fixing part are folded in such a way that they directly lie on each other flatly and that at least around the bore at least double thickness of material is provided. Such a fixing part can be manufactured in an especially easy manner, as deformations of material are limited.

Advantageously, a sheet metal section has the outline of the fixing part looked at in direction of the axis of the bore. The other sheet metal section can be essentially smaller in the area of the bore. In order to give the wiper arm a pleasing appearance, but also in order to avoid any edges, gaps, depressions or the like in which dirt and water can collect to occur on its surface turned away from the windshield which is to be cleaned, the upper sheet metal section preferably has the outline of the fixing part.

In order that the bore does not widen too easily in the single sheet metal layers preferably each sheet metal layer includes one single sheet metal section leading around said bore. Consequently, the edge of the bore is without a seam.

In a preferred embodiment of the wiper arm two sheet metal sections of the fixing part are folded round an edge situated behind the bore running crosswise to the longitudinal direction of the fixing part. In another preferred embodiment two sheet metal sections of the fixing part are folded around an edge of the longitudinal side. In a preferred embodiment a wiper arm is presented in which a second sheet metal section is folded around the one edge of the longitudinal side of a first sheet metal section and a third sheet metal section is folded around the opposite edge of the longitudinal side of the first sheet metal section. In this way edges of the longitudinal sides of the fixing part are provided which are rounded on both sides. The second and the third sheet metal section each preferably cover approximately half of the first sheet metal section, seen crosswise to the longitudinal direction of the fixing part. In order to avoid a seam in the bore in the sheet metal layer between the second and the third sheet metal section the second sheet metal section is widened in the area of the bore especially as far as up to the edge of the first sheet metal section. This causes the third sheet metal section to become correspondingly smaller or to completely disappear. In order to further increase the stability of the fixing part, the second sheet metal section and the third sheet metal section engage each other in the way of a dovetail at their front sides. It is possible to fold two sheet metal sections on each other, which are completely identical at least in sections. The front sides of these two sheet metal sections are visible when looking upon the fixing part vertically relative to the direction of the axis of the bore. If left uncovered, the sharp edges of the fixing part would pose a danger. The fixing part would be very sharp in the area of these uncovered front sides. Therefore, in a preferred embodiment the sheet metal section having the outline of the fixing part includes an upright standing cheek at the side of the edge, the height of which corresponds to the total thickness of the sheet metal sections lying on top of each other and which covers the front side of another sheet metal section, seen vertically to the axis of the bore.

Because a simple folding is only possible around a straight edge, a folding edge is provided between two sheet metal sections and only reaches as far as a plane, which, going through the axis of the bore, runs vertically to the longitudinal direction of the fixing part. Behind this plane the outline of the fixing part can be formed easily by an arc of a circle, the center of which is placed one the axis of the bore.

By folding the sheet metal, it is possible to obtain more than a twofold thickness of material in the area of the bore of the fixing part. For this purpose, in a preferred embodiment a second sheet metal section with an opening is folded around a first edge of the longitudinal side and a third sheet metal section with an opening is folded around a second edge of the longitudinal side of a first sheet metal section. Preferably the sheet metal sections are folded in such a way that the second sheet metal section lies on top of the first sheet metal section, and the third sheet metal section lies on top of the second sheet metal section. The first sheet metal section reaches as far as to the coupling point of a joint piece and comprises the means for coupling the joint piece at side cheeks that are bent away from said sheet metal section. In another preferred embodiment a first and a second sheet metal section with an opening are each folded with one another and the second and a third sheet metal section with one opening are folded with one another. The third sheet metal section may be situated between the first and the second sheet metal section.

In order to obtain a more than threefold thickness of material in the area of the bore a preferred embodiment is disclosed in which a second sheet metal section is folded around a first edge of the longitudinal side and a third sheet metal section is folded around a second edge of the longitudinal side of a sheet metal section. Additionally, a fourth sheet metal section with an opening is folded around an edge of the cross side of the first sheet metal section. In this case the fourth sheet metal section preferably directly bears against the first sheet metal section.

If two sheet metal sections lying on top of each other are spaced from each other, it is possible, to support the one sheet metal section by an upright standing against a flat side of the other sheet metal section. In this case this upright standing edge has a distance from the outline of the fixing part. If the sheet metal section with the upright standing edge is smaller in its outline than the other sheet metal section, the upright standing edge can be situated at the outline of the corresponding sheet metal section. A preferred embodiment is disclosed in which the upright standing edge is situated at the opening of the corresponding sheet metal section belonging to the bore.

The stability of shape of the fixing part of a wiper arm is further improved by providing sheet metal sections lying on top of each other and interconnected at various locations. A connection by spot welding or self-riveting is preferred in this case.

It is common today to place a wiper arm with its fixing part on a conically tapering, knurled fixing section of the wiper shaft. Accordingly the bore in the fixing part of the wiper arm is also conical. In a wiper arm according to the present invention the adjustment of the bore to the conically tapering fixing section of the wiper shaft is preferably achieved in such a way that the bore is provided with a constant diameter within a sheet metal section, seen in axial direction, and that the diameter increases from sheet metal section to sheet metal section by the same amount as the diameter of the conical section of the Wiper shaft, onto which the fixing part can be fitted by way of the bore. In case higher torques are to be transferred, it is favourable, to press a cone in the stepped bore with a.

A conically tapering bore may be manufactured or worked by metal cutting after the folding of the fixing part.

Several embodiments of a wiper arm according to the invention are shown in the drawings. The invention is now explained in detail by way of the Figures of these drawings in which;

FIG. 1. is a cross sectional view of the wiper arm of the present invention, in which two sheet metal sections are folded around a longitudinal side edge of the fixing part, the one sheet metal section covering a front side of the other sheet metal section by an upright standing cheek;

FIG. 2 is a bottom view of the mere fixing part of FIG. 1 in direction of the arrow A;

FIG. 3 is a cross sectional view taken along line III—III of FIG. 2;

FIG. 4 is a cross sectional view taken along line IV—IV of FIG. 2;

FIG. 5 is a cross sectional view taken along line V—V of FIG. 1, wherein, however, only the mere fixing part is shown;

FIG. 6 is a second embodiment of the wiper arm of the present invention in which another sheet metal section is folded around both longitudinal edges of any upper sheet metal section und in which the two bottom sheet metal sections both bear against the upper sheet metal section;

FIG. 7 is a cross sectional view of the fixing part of FIG. 6 taken along line VII—VII of FIG. 6;

FIG. 8 is a cross sectional view taken along line VIII—VIII of FIG. 6;

FIG. 9 is a cross sectional view taken along line IX—IX of FIG. 6;

FIG. 10 is a cross sectional view of a third embodiment, in which threefold thickness of material is provided in the area of the bore;

FIG. 11 is the embodiment according to FIG. 10 before the complete folding;

FIG. 12 is a longitudinal cross sectional view similar to the one of FIG. 7 of a forth embodiment of the present invention, comprising threefold thickness of material in the area of the bore, the sheet metal sections of which, however, are folded in a way other than in the embodiment according to FIGS. 10 and 11;

FIG. 13 is a cross sectional view corresponding to a fifth embodiment of the present invention disclosing a fourfold thickness of material in the area of the bore;

FIG. 14 is a longitudinal cross sectional view corresponding to a sixth embodiment of the present invention wherein only two sheet metal sections lie on top of each other;

FIG. 15 is a partial cross sectional view showing two sheet metal sections of a fixing part lying on top of each other with openings of different diameter;

FIG. 16 depicts connecting two sheet metal sections to each other by self-riveting, wherein the punch used for this and the matrix used for this are shown at the end of the working stroke;

FIG. 17 depicts connecting two sheet metal sections by self-riveting, wherein, however, the surface of the one sheet metal section is substantially flat;

FIG. 18 is a cross sectional view of a seventh embodiment in which two sheet metal sections folded against each other are distant from each other and are supported against each other by an edge standing upright from one section surrounding the bore;

FIG. 19 is a longitudinal section of an eigth embodiment, in which two sheet metal sections are distant from each other and are supported against each other by individual sections of the edge at the outside periphery of the one sheet metal section;

FIG. 20 is a bottom view of the embodiment of FIG. 19 in direction of the arrow P; and FIG. 21 is a cross sectional view taken along the line XXI—XXI of FIG. 20.

DETAILED DESCRIPTION OF THE PREFERRED EMBODIMENTS

As essential components the wiper arm according to FIG. 1 comprises a fixing part 30, by means of which it is non-rotatably fixed at a wiper shaft 31, a joint piece 32, which is swivellably coupled at the fixing part 30 via a hinge pin 33. The Joint piece is formed from one piece of sheet metal and bent to a U-shape form in cross-section. A wiper rod 34 extends into the Joint piece 32 at its one end 35 and is fixed at the joint piece with this end 35, and which is bent to form a hook 36 on its other end so that it can be connected with a wiper blade. A pressure spring 37, is situated within the joint piece 32 and which is hung up via bow 38 and a pin 39 at the fixing part 30. The points, where the pressure spring 37 is hung up at the fixing part 30 and at the wiper rod 34 are chosen in such a way that the line where the pressure spring 37 is effective is distant from the axis of the hinge pin 33 in an operating position of the joint piece 32, as shown in FIG. 1.

Therefore, the pressure spring 37 urges the joint piece against the the fixing part in the direction of a windshield which is to be cleaned, and by this provides for the necessary pressure of the wiper blade, which is not shown, against the windshield.

Apart from the Joint piece 32, the fixing part 30 of the wiper arm according to FIG. 1 is also made of a sheet metal. It is possible to distinguish an upper sheet metal section 45, at which the screw 46 for clamping the fixing part 30 bears against a cone 47 of the wiper shaft 31, from a bottom sheet metal section 48. The two sheet metal sections 45 and 48 lie planely on top of each other especially in the area of a bore 49, by means of which they are placed on the cone 47 of the wiper shaft 31 and which bore, therefore, is also reduced conically.

When looking at the fixing part 30 along the direction of the central axis of the wiper shaft 31, the upper sheet metal section 45 covers the complete outline of the fixing part 30. This outline is symmetrical to a longitudinal center plane 50 of the fixing part 30 and consists of a semicircle 51; the center of which lies on the axis of the bore 49; of two straight sections 52 starting from the semicircle 51 and slightly running towards each other; of adjoining sections 53 running parallely to the center plane 50; and of a section 54 forming the front limitation and running vertically to the center plane 50 which section comprises a recess 55.

In the area of the semicircle 51 and in the area of the one section 52, a cheek stands upright from the upper sheet metal section 45 downwardly, the height of which cheek corresponds to the double material thickness of the sheet metal, of which the fixing part 30 is manufactured. Towards the one section 53 of the outline the cheek 56 gradually changes into a higher side cheek 57. Also at the other section 52 a side cheek 57 is bent away from the upper sheet metal section 45. The two side cheeks 57 are provided with bores 58 and 59 aligning with each other. The bores 58 accommodate the hinge pin 33 and the bores 59 take up the pin 39. At the other section 52 and slightly in the section 53 adjoining this section 52, the two sheet metal sections 45 and 48 are folded against each other. In the area of the bore 49 the folding edge ends at a plane 60 standing vertically on the center plane 50 and passes through the axis of the bore 49 so that it does not reach into the semicircle 51 of the outline. The sheet metal section 48 extends around the bore 49 behind this plane 60, its front side 62 as well in the area of the semicircle 51 as in the area of the section 52 of the outline, lying opposite the folding edge having only a small distance from the cheek 56, which covers this front side, in a view vertically to the wiper shaft 31. In the area of the transition between the sections 52 and 53 of the outline, the front side 62 of the sheet metal section 48 gradually moves away from the cheek 56, respectively from the adjoining side cheek 57 and passes over into the front edge of the other side cheek 57 with the sheet metal section 48 decreasing gradually.

Regarding the embodiment of FIGS. 1 to 5, the following shall be especially pointed out. In each sheet metal layer lying on top of each other in the direction of the axis of the bore, the bore 49 is formed respectively in one single sheet metal section 45 or 48, surrounding it. There is no seam in the rim of the bore, when moving on peripherically. The two sheet metal sections 45 and 48 are folded around a longitudinal side egde of the fixing part 30. In order not to have a too thick and unattractive deformation of material at the transition between the folding edge between the two sheet metal sections 45 and 48 and the cheek 56, the folding edge and the cheek 56 are separated there by a slot 61.

The recess 55 permits the bow 38 to immerse into the upper sheet metal section 45, when the joint piece 32 with the wiper rod 34 is folded down.

In an alternative embodiment, fixing part 30 according to FIGS. 6 to 9 mostly comprises the same shape and the same outline as the fixing part according to FIGS. 1 to 5. The outline is formed by a semicircle 51, two straight sections 52 slightly running towards each other, two parallel sections 53 and one section 54 with a recess 55. However, the two sections 52 are slightly lengthened at the expense of the sections 53. As in the embodiment according to FIGS. 1 to 5, also in the embodiment according to FIGS. 6 to 9, in the area of the one section 52 of the outline, a sheet metal section 48 is folded with the upper sheet metal section 45, which sheet metal section 48 surrounds the bore 49 and the front side of which is covered by a cheek 56 existing in the area of the semicircle 51.

At a distance from the bore 49, the front side 62 of the sheet metal section 48 moves away from the section 52 of the outline lying opposite the folding edge and recedes as far as to the center plane 50 of the fixing part 30. Towards the side cheeks 57 the front side 62 again passes over the front side of the one side cheek 57 with the sheet metal section 48 becoming smaller. The side cheek meets the front side exactly at the transition between the section 52 and a section 53 of the outline.

An additional sheet metal section 65 is folded with the upper sheet metal section 45 at the opposite section 52 of the outline. Mostly, it reaches as far as to the center plane 50 and its front side 62 only has a small distance from the front side 62 of the sheet metal section 48. Consequently, both sheet metal sections 48 and 65 each cover approximately half the upper sheet metal section 45, seen crosswise to the longitudinal direction of the fixing part 30. The front side 62 of the sheet metal section 65 gradually passes over into the front side of the other side cheek 57 as well as the front side 6Z of the sheet metal section 48 into the front side of the first side cheek. Also, the front side 62 of the sheet metal section 65 gradually passes over into the cheek 56 of the upper sheet metal section 45.

In the embodiment according to the FIGS. 6 to 9 the conical bore 49 is manufactured by deep-drawing of the sheet metal section 48 by forming a collar 66. The collar 66 reaches into an opening 67 in the upper sheet metal section 45.

In the embodiment according to FIGS. 10 and 11 the fixing part 30 has threefold material thickness in the area of the conical bore 49. In this case a sheet metal section 48 is folded with the upper sheet metal section 45 at the one longitudinal edge side of the fixing part 30 and placed on top of it. A third sheet metal section 70 is folded around the other longitudinal side edge by means of the sheet metal section 45, which sheet metal section 70 lies on top of the sheet metal section 45. As shown in FIG. 11, the two sheet metal sections 48 and 70 can be brought in a position at the same time at first, in which they stick out the sheet metal section 45 vertically. Then, however, the sheet metal section 48 has to be put onto the sheet metal section 45 at first, before the sheet metal section 70 is to be completely folded. For forming the conical bore 49 it is possible to punch openings 71, 72 and 73 out of the sheet metal sections 45, 48 and 70 before the folding and in the plane state of the sheet metal section. In this case the openings are made variable in their diameters, the diameter of the opening 71 being the smallest and the one of the opening 73 the largest.

It can be seen, that in the fixing part according to FIGS. 10 and 11 in each sheet metal layer the corresponding axial section of the bore 49, namely the opening 71, the opening 72 and the opening 73 are developed in one single sheet metal section surrounding the opening. The same applies to the embodiment according to FIG. 12, in which also three-fold material thickness is provided in the area of the bore 49, in the case of which, however, the various sheet metal sections are not folded around the longitudinal side egdes, but around folding edges running transversely to the longitudinal direction of the fixing part 30. Furthermore, only one single sheet metal section 74 is folded around a folding edge, lying behind the bore 49, seen from the Joint piece of a wiper arm, with the top sheet metal section 45, which again comprises the outline of the fixing part and reaches as far as to the coupling point of the joint piece. A third sheet metal section 75 is folded around an edge, situated in front of the bore (with the sheet metal section 74) and is placed between the upper sheet metal section 45 and the bottom sheet metal section 74. Free front side 62 is thus covered by the bend between the sheet metal section 45 and the sheet metal section 74. Laterally, the front sides of the sheet metal sections 74 and 75 can be covered by a correspondingly high cheek at the sheet metal section 45. The two folding edges between the sheet metal section 45 and the sheet metal section 74, on the one hand, and the sheet metal section 74 and the sheet metal section 75, on the other hand, run parallely towards each other.

In the embodiment according to FIGS. 13 and 14 a fourfold material thickness is reached in the area of the bore 49. For this purpose, at first, similar to the embodiment according to FIG. 12, a sheet metal section 74 is folded with the upper sheet metal section 45 around a folding edge, running transversely to the longitudinal direction of the fixing part and situated behind the bore. This sheet metal section 74 directly lies on top of the sheet metal section 45. Furthermore, similar to the embodiment according to FIGS. 10 and 11, a sheet metal section 48 is folded around the one longitudinal side edge of the sheet metal section 45, and a sheet metal section 70 with the sheet metal section 45 is folded around the other longitudinal side edge of the sheet metal section 45. The sheet metal section 48 lies on top of the sheet metal section 74 and the sheet metal section 70 lies on top of the sheet metal section 48. From FIG. 14 can be seen that the sheet metal section 74 is bent first and that then sheet metal sections 48 and 70 are bent one after the other. All sheet metal sections are provided with openings 71, 72, 76 respectively, before they are folded.

In the enlarged representation according to FIG. 15 it can be clearly seen that in the embodiments according to FIGS. 1 to 5, 10 and 11, 12 as well as 13 and 14 the openings of the sheet metal sections lying on top of each other are punched out with different diameters. In FIG. 15, the openings 71 and 72 of the sheet metal sections 45 and 48 of FIGS. 1 to 5 and FIGS. 10 and 11 are to be referenced. The openings 71 and 72 are provided with a constant diameter, seen in axial direction of the bore formed by said openings, the diameter increasing from the sheet metal section 45 towards the sheet metal section 48 (i.e., from the top to the bottom). The diameter of an opening being situated farther downwards by the same amount is larger than the diameter of an opening lying directly above, by which the diameter of the cone 47 of the wiper shaft 31 increases within the thickness of material of a sheet metal section. When only small torques have to be transferred from the wiper shaft to the wiper arm, a bore 49 of stepped design according to FIG. 15 is sufficient for safely fixing the wiper arm on the wiper shaft. When higher torgues are to be transferred, a cone (e.g., an insertion sleeve) can be pressed into the bore 49 with a tool so that the abutment surface between bore 49 and cone 47 of the wiper shaft grows larger.

It is also possible to fold the various sheet metal sections without openings and to manufacture the conical bore after the folding procedure by metal cutting, for example by a conical mandrel.

In the foregoing embodiments the sheet metal sections of the fixing parts lie directly on top of each other. In order to increase the stability of shape of the fixing part, it is possible to weld sheet metal sections lying on top of each other at points. Such pointwise self-riveting is shown in detail in FIG. 16. In this case a rotary punch plate 85 presses material at first, for example of a sheet metal section 45, and material, for example of a sheet metal section 48, into a die 86. When power is increased further the material of the sheet metal section 48 is forced to flow behind material of the sheet metal section 45 situated at the side of the die, towards the outside. This is possible, because the displaced material situated at the side of the die can flow away into a space provided for this purpose to the bottom of the die. If it is desired to avoid the wart-like raised part on the sheet metal 48 (and in this case on the upper side of a fixing part 30), the wart can be pressed completely into the plane of the sheet metal section 45 according to FIG. 17, by releasing a volume necessary for the material flow on the side of the punch 85. For this purpose a movable punch 87 can be used as part of die 86.

FIG. 18 as well as FIGS. 19 and 21 show two embodiments of a fixing part according to the invention, in which two sheet metal sections lie on top of each other in axial direction, however are distant (or spaced) from each other.

In the embodiment according to FIG. 18 the two sheet metal sections are bent around each other at the one longitudinal side edge. At the other longitudinal side edge the upper sheet metal section 45 is provided with a cheek showing downwardly, on the front side of which the bottom sheet metal section 48 lies on top. In addition to this support of the bottom sheet metal section 48 against the upper sheet metal section 45 at the outline of the fixing part, the two sheet metal sections 45 and 48 are suppported against each other around the bore 49 at a distance from the outline 44. The sheet metal section 48 is provided with a deep-drawn collar 90 surrounding the bore 49, similar to the sheet metal section of the embodiment according to FIGS. 6 to 9. The free front side of which collar, however, bears against the bottom side of the sheet metal section 45, as opposed to the embodiment according to FIGS. 6 to 9. In this way it is reliably avoided that the two sheet metal sections 45 and 48 are pressed closer together, when the screw 46 is tightened.

While in the embodiment according to FIG. 18 a sheet metal section is folded with the upper sheet metal section 45 around a longitudinal side edge, in the embodiment according to FIGS. 19 to 21 a sheet metal section 74 is folded around an edge situated behind the bore 49 and runs crosswise to the longitudinal direction of the fixing part 30. In order to obtain a straight folding edge, the outline of the fixing part behind the plane 60 standing vertically on the longitudinal direction of the fixing part 30 and extending through the axis of the bore is not developed as a semicircle, but to be angular with rounded corners so that there is a straight section 91 of the outline behind the bore 49.

In this section, the folding edge is between the sheet metal section 45 and the sheet metal section 74. Looked at vertically to the longitudinal direction of the fixing part, this one is smaller than the sheet metal section 45 and is laterally covered by cheeks 56 set up by the sheet metal section 45, which cheeks are separated from the sheet metal section 74 by small slots 61, similar as it applies to the sheet metal sections 48 and the cheek 56 of the embodiment according to FIGS. 1 to 9. Also, the sheet metal section 74 is supported against the bottom side of the sheet metal section 45 around the bore 49 and at a distance from the outline 44 of the fixing part 30. For this an edge 92 is set up at the outline of the sheet metal section 74, which edge is made from an edge section 93 being opposite to the folding edge with regard to the bore and two edge sections 94 directed vertically and lying opposite with regard to the bore 49. The edge sections 94 are separated from the remaining material of the sheet metal section 74 at their ends by small slots 61 each. The edge section 93 extends along the whole width of the sheet metal section 74 so that no recesses are necessary for setting it up, whereby an excessive deformation of material can be avoided.

It is important, also for the embodiment according to FIGS. 18 to 21 that in each sheet metal layer, the opening serving for forming the bore 49 is situated in one single sheet metal section.

What is claimed is:

1. An elongated fixing part for an automotive windshield wiper arm assembly, said fixing part comprising:
   a first longitudinal end having means for mounting said part to a wiper shaft;
   a second longitudinal end;
   means at said second longitudinal end for pivotally securing said fixing part to a joint piece of said arm assembly;
   an elongated upper sheet metal section with a lower face and an outer edge, and;
   an elongated lower sheet metal section with an upper face integrally connected with said upper sheet metal section such that a folding edge is formed along a portion of an edge of said fixing part, said upper face of said lower sheet metal section parallel with said lower face of said upper sheet metal section at said first longitudinal end of said fixing part to create at least a twofold thickness of said sheet metal; and
   a cheek extending downwardly from said outer edge of said upper sheet metal section at least at said first longitudinal end generally perpendicular to said lower face, wherein said upper sheet metal section is axially supported by said lower sheet metal section independently of said cheek, said upper face of said lower metal section lying directly on and in contact with said lower face of said upper metal section.

2. An assembly as recited in claim 1, wherein a slot is formed in a transition zone between said folding edge and said cheek to prevent unwanted deformation of said sheet metal.

3. An assembly as recited in claim 2, wherein said first longitudinal end of said fixing part is rounded.

4. An assembly as recited in claim 2, wherein said folding edge extends along a longitudinal side edge of said fixing part.

5. An automotive windshield wiper arm assembly, said assembly comprising an elongated fixing part, a first longitudinal end of said fixing part having means for mounting said part to a wiper shaft and means at a second longitudinal end securing said fixing part to a joint piece, the joint piece receiving a wiper rod, said fixing part manufactured from sheet metal and including an upper sheet metal section with a lower face and an outer edge, and a lower sheet metal section with an upper face integrally connected with said upper sheet metal section such that a folding edge is formed along a portion of an edge of said fixing part, said upper face of said lower sheet metal section parallel with said lower face of said upper sheet metal section at said first end of said fixing part to create at least a twofold thickness of said sheet metal, a first opening in said upper sheet metal section aligned with a second opening in said lower sheet metal section and adapted to receive the wiper shaft, wherein, at least at said first end, said upper sheet metal section includes a longitudinal side cheek extending axially downwardly from said outer edge generally perpendicular to said lower face, said upper sheet metal section axially supported by said lower sheet metal section independently of said cheek with said upper face of said lower metal section lying directly on and in contact with said lower face of said upper metal section.

6. An assembly as recited in claim 5, wherein said securing means comprises said cheek extending between said first and second longitudinal ends, said cheek extending a greater axial distance from said lower face of said upper sheet metal section at said second longitudinal end of said fixing part as compared to said first longitudinal end.

7. An assembly as recited in claim 6, wherein said securing means includes an opposing longitudinal side cheek formed at said second longitudinal end.

8. An assembly as recited in claim 7, wherein said securing means includes a first bore extending through said first longitudinal side cheek and a second bore extending through said opposing longitudinal side cheek, a hinge pin disposed within said bores and mating with said joint piece.

9. An assembly as recited in claim 5, wherein said cheek encompasses a portion of an outer edge of said lower sheet metal section.

10. An assembly as recited in claim 5, wherein a slot is formed in a transition zone between said folding edge and said cheek to prevent unwanted deformation of said sheet metal.

11. An assembly as recited in claim 5, wherein a diameter of said first bore is different than a diameter of said second bore.

12. An assembly as recited in claim 5, wherein said first longitudinal end of said fixing part is rounded.

13. An assembly as recited in claim 5, wherein said lower face of said upper sheet metal section is in facial contact with said upper face of said lower sheet metal section.

14. An assembly as recited in claim 5, wherein said folding edge extends along a longitudinal side edge of said fixing part.

15. An assembly as recited in claim 14, wherein said fixing part comprises a second lower sheet metal section with a second folding edge extending along an opposing longitudinal side edge of said fixing part.

16. An assembly as recited in claim 5, wherein said lower sheet metal section includes a collar extending from said second bore toward said first bore.

17. An assembly as recited in claim 16, wherein said collar extends into said first bore.

18. An assembly as recited in claim 5, wherein said folding edge extends along an edge of said first longitudinal end generally transverse to a longitudinal side edge.

19. An assembly as recited in claim 5, wherein one of said lower sheet metal section and said upper sheet metal section of said fixing part includes a second folding edge to create a third sheet metal section disposed between said upper sheet metal section and said lower sheet metal section.

20. An automotive windshield wiper arm assembly, said assembly comprising an elongated fixing part, a first longitudinal end of said fixing part having means for mounting said part to a wiper shaft and means at a second longitudinal end securing said fixing part to a joint piece, the joint piece receiving a wiper rod, said fixing part manufactured from sheet metal and including an upper sheet metal section with a lower face and an outer edge, and a lower sheet metal section with an upper face integrally connected with said upper sheet metal section such that a folding edge is formed along a portion of an edge of said fixing part, said upper face of said lower sheet metal section parallel with said lower face of said upper sheet metal section at said first end of said fixing part to create at least a twofold thickness of said sheet metal, a first opening in said upper sheet metal section aligned with a second opening in said lower sheet metal section and adapted to receive the wiper shaft, wherein said upper sheet metal section includes, at least at said first end, a first longitudinal side cheek forming part of said securing means which extends axially downwardly from said outer edge generally perpendicular to said lower face between said first and second longitudinal ends, said first cheek having a greater axial extent at said second longitudinal end, said securing means also including an opposing second longitudinal side cheek formed at said second longitudinal end integral with said upper metal section, a transition zone formed between an outer edge of said lower sheet metal section and a corresponding edge of said opposing side cheek, material from said lower sheet metal section being used to form said opposing side cheek along said folding edge.

21. An assembly as recited in claim 20, wherein said upper sheet metal section is axially supported by said lower sheet metal section independently of said cheeks with said upper face of said lower metal section lying directly on said lower face of said upper metal section at said first longitudinal end.

* * * * *